United States Patent [19]

O'Farrell

[11] 3,912,683

[45] Oct. 14, 1975

[54] PROCESS FOR THE PREPARATION OF SULFOBUTYL LATEX
[75] Inventor: Charles P. O'Farrell, Clark, N.J.
[73] Assignee: Exxon Research and Engineering Company, Linden, N.J.
[22] Filed: July 12, 1974
[21] Appl. No.: 487,907

[52] U.S. Cl.............260/29.7 B; 260/29.7 AT; 260/29.7 E; 260/29.7 EM; 260/29.7 N; 260/29.7 NQ; 260/29.7 PT; 260/29.7 SQ; 260/79.3 R
[51] Int. Cl............................................ C08d 5/00
[58] Field of Search .. 260/29.7 B, 29.7 EM, 29.7 E, 260/29.7 AT, 29.7 PT, 29.7 SQ, 29.7 NQ, 29.7 N, 79.3 R

[56] References Cited
UNITED STATES PATENTS
3,779,974  12/1973  Hubbard et al. ............... 260/29.7 B OTHER PUBLICATIONS
Blackley, High Polymer Latices, I, pp. 19–28, (Applied Science, 1966).

Primary Examiner—Melvin Goldstein
Assistant Examiner—T. De Benedictis, Sr.
Attorney, Agent, or Firm—A. Lagani, Jr.; H. E. Naylor

[57] ABSTRACT

Sulfonated butyl rubber containing greater than 0.5 mole percent sulfonate functionality is emulsified by dissolving the butyl rubber in an aromatic solvent, i.e. toluene, sulfonating the polymer, neutralizing the polymer with a weak base, and thereafter emulsifying the solution using as the emulsifying agent an anionic emulsifier, i.e. a sodium sulfate derivative of an ethoxylated nonyl phenol containing 4 moles of ethylene oxide.

7 Claims, No Drawings

3,912,683

PROCESS FOR THE PREPARATION OF SULFOBUTYL LATEX

BACKGROUND OF THE INVENTION

This invention relates to a method for producing aqueous emulsions and latices of sulfonated butyl rubber.

It is well known in the art to produce synthetic latices of high polymers by preparing the polymer by emulsion polymerization. This method, however, is not applicable to high polymers made by essentially anhydrous polymerization. Methods have been developed for preparing latices of such polymers by preparing emulsions of the polymer from cements of the polymer and thereafter stripping off the polymer solvent and some of the water to produce concentrated latices suitable for use as coatings and film formers. Such latices of the high polymers are prepared from solvent solutions thereof by the steps of (1) providing a dispersion or cement in a volatile organic solvent for the polymer, (2) adding to such dispersions, water and aqueous emulsifier and emulsifying the same to produce an emulsion, (3) stripping the volatile solvent and (4) recovering the resulting latex product; see, for example, U.S. Pat. No. 3,503,917 incorporated herein by reference.

Recently, sulfonated ionomers of butyl rubber have been prepared. These polymers have improved tensile strength and other improved physical properties in the raw, unvulcanized gum state; see, for example, U.S. Pat. No. 3,642,728, incorporated herein by reference. The excellent physical properties of these unvulcanized polymers suggest their use in latices. It has not heretofore, however, been possible to prepare latices from these sulfonated rubber polymers.

Methods for preparing latices of commercial sulfonated polyethylene are known in the art wherein a salt of a polymeric sulfonic acid derived from the polyethylene is dissolved in a water-miscible solvent more volatile than water. Thereafter water and a precipitant compound are added to cause opalescence; see, for example, U.S. Pat. No. 3,245,935 incorporated herein by reference.

Latices from polymers of vinylidene compounds and their hydrogenated products have been prepared from emulsions with the addition subsequent to emulsification of about 1 to about 70 volume percent based on the water phase of a highly water soluble oxygen compound of about 2 to 10 carbon atoms; see, for example, U.S. Pat. No. 3,310,516 incorporated herein by reference. It has been taught that improved results are obtained if the water component is water immiscible; see, for example, U.S. Pat. No. 3,305,508 incorporated herein by reference. Conventional butyl rubbers and generally most synthetic polymers are emulsified by the use of cationic or anionic emulsifiers. However, these emulsifier systems have not been used successfully to emulsify sulfonated butyl rubber containing at least 0.5 mole percent sulfonic acid groups.

More recently, sulfonated butyl rubber has been emulsified in the acid form using certain nonionic emulsifiers. The method of that invention requires that the acid form and not a neutralized sulfonate form of the sulfonated rubber be used in preparing the latex. See, for example, U.S. Pat. No. 3,770,682 incorporated herein by reference.

SUMMARY OF THE INVENTION

It has surprisingly been found that emulsions of sulfonated butyl rubber may be prepared by sulfonating a cement of butyl rubber in an aromatic solvent, neutralizing the sulfonated product with ammonium hydroxide or an organo amine and thereafter emulsifying this solution of neutralized sulfonated butyl rubber using as the anionic emulsifying agent the sodium sulfate derivative of an ethoxylated nonyl phenol containing about 4 moles of ethylene oxide.

DETAILED DESCRIPTION OF THE INVENTION

This invention relates to a method for preparing emulsions of sulfonated butyl rubber; in particular, the invention relates to the preparation of latices from these emulsions.

The term "butyl rubber" as used in the specification and claims means copolymers of isoolefins and conjugated dienes which comprise about 0.5 to about 15 mole percent conjugated diene and about 85 to 99.5 mole percent isoolefin. Illustrative examples of the isoolefins which may be used in the preparation of butyl rubber are isobutylene, 2-methyl-1-propene, 3-methyl-1-butene, 4-methyl-1-pentene and $\beta$-pinene. Illustrative examples of conjugated dienes which may be used in the preparation of butyl rubber are isoprene, butadiene, 2,3-dimethyl butadiene, chloroprene, piperylene, 2,5-dimethylhexa-2,4-diene, cyclopentadiene, cyclohexadiene and methylcyclopentadiene. The preparation of butyl rubber is described in U.S. Pat. No. 2,356,128 and is further described in an article by R. M. Thomas et al. in Industrial and Engineering Chemistry, vol. 32, pp. 1283 et seq., October 1940.

The preparation of sulfonated butyl rubber is well known in the art. Butyl rubber may be sulfonated by reacting a solution of butyl rubber in a suitable solvent for the butyl rubber with a sulfonating agent. The sulfonating agent may be an acyl sulfate or a complex of a Lewis base and a sulfur trioxide donor. Illustrative examples of Lewis bases which may be used are trialkyl phosphates, dioxanes, trialkyl amines, etc. A detailed description of the manner of preparing sulfonated butyl rubber may be found in U.S. Pat. No. 3,642,728 and U.S. application Ser. No. 123,908. This invention is in no way intended to be limited by the method of producing the sulfonated butyl rubber.

Prior art methods of preparing emulsions of sulfonated butyl rubbers required that the acid form rather than the neutralized form of the sulfonated butyl rubber be used. Furthermore, only a combination of nonionic emulsifiers were found useful in preparing emulsions of sulfonated butyl rubber containing at least 0.5 mole % sulfonic acid groups.

It has now been found and forms the substance of this invention that it is possible to emulsify the neutralized sulfonated butyl rubber using anionic emulsifiers. The emulsifier used in the practice of this invention is a sodium sulfate derivative of an ethoxylated nonyl phenol containing 4 moles of ethylene oxide. Such a product is commercially available under the trade name "Alipal CO-430". The emulsifier is used at about 5 to about 15 parts per hundred of the emulsifier based on the elastomer. Surprisingly, the raw emulsion formed by this technique has excellent stability due to very small particle size of the emulsion, e.g., average 0.1 micron.

In carrying out the emulsification of sulfonated butyl rubber in the manner of this invention, it is preferred that a coupling agent be used. Suitable coupling agents are alcohols, ammonium hydroxide and amines. Illustrative examples of such coupling agents are normal propyl alcohol, butyl alcohol, cyclohexyl amine, propyl amine, pyridine, triethanolamine, etc. Generally, any water-soluble alcohol or amine is suitable for use as a coupling agent. The coupling agent is used at about 5 to about 20 parts per hundred based on the cement phase of the sulfonated butyl rubber cement to be emulsified.

The term "cement" as used in the specification and claims means the viscous solution of polymer and solvent. The sulfonated butyl rubber cement should have a viscosity of 10,000 cps or less when measured at the temperature of emulsification by a Brookfield viscometer using a number 3 spindle at 12 rpm. The emulsion may be formed at temperatures of about 50° to 180°F.; preferably about ambient temperature to about 140°F.; more preferably at about 70° to about 100°F. The cement viscosity is preferably about 3000 cps to about 6000 cps, e.g., 4000 cps.

The preferred sulfonating agent is an acyl sulfate. Acyl sulfates suitable for use in the practice of the invention include acetyl sulfate, propionyl sulfate or butyryl sulfate. The preferred acyl sulfate is acetyl sulfate.

In carrying out the process of this invention, it is essential that the sulfonated butyl rubber be dissolved in an aromatic hydrocarbon solvent, i.e. toluene, benzene, xylene, etc. Furthermore, the emulsifying agent must be such that it is a good dispersant for both the sulfonated butyl polymer and the aromatic solvent. For example, cements of sulfonated butyl rubber and hexane are inoperative using the emulsifiers of this invention. Although it is preferred that the sulfonated butyl rubber be prepared in situ in toluene and thereafter emulsified, where desired sulfonated butyl rubber may be prepared, neutralized and precipitated from the cement and thereafter redissolved in a mixture of an aromatic and polar solvent in the preparation for making an emulsion.

The finished latex which has been neutralized during synthesis with a weak base, such as ammonium hydroxide, may then be treated subsequently with a stronger base such as metal hydroxides to increase the ionic bonding of the film cast from the latex. In any case, films cast from the neutralized latex of this invention have excellent strength. This latex is useful as a binder for non-woven fabrics, as an adhesive and because of its small particle size is suitable for use in paper coating operations.

The term "stronger base" as used in the specification and claims means metal compounds and organic amines having a $pK_b$ value of less than 3.0. Illustrative of such stronger bases are metal hydroxides, e.g., Na, Ca, Ba, metal alkoxides, e.g., sodium methoxide, metal carbonates, e.g., $Na_2CO_3$, $BaCO_3$, or amine compounds such as tetraorgano ammonium hydroxide, e.g., tetramethyl ammonium hydroxide or trimethyl benzyl ammonium hydroxide.

The sulfonation reaction of this invention is complete in about 10 to 60 minutes with minimal heat or pressure build-up. The reaction may be quenched with an alcohol and the product neutralized, the preferred neutralizing agent being a weak base. The term "weak base" as used in the specification and claims means ammonium hydroxide or organo amines with a $pK_b > 3.0$. Particularly useful organo amines are hydrocarbon amines. Illustrative of these organo amines are ethylamine and triethylamine, propylamine, triethanol amine, phenylamine, etc.

A detailed description of the process for preparing sulfonated butyl rubber using acyl sulfates may be found in U.S. application Ser. No. 239,307, now U.S. Pat. No. 3,836,511 incorporated herein by reference. The method of sulfonation of the butyl rubber, however, is not critical to this invention. As in pointed out in the above-referenced application, however, the use of acyl sulfates as a sulfonating agent results in sulfonated polymers of improved physical properties.

The advantages of the instant invention may be more readily appreciated by reference to the following examples.

EXAMPLE 1

— Sulfonation of Baled Butyl 268 in Toluene

Butyl 268 is a copolymer of isobutylene (98.5 mole %) and isoprene (1.5 mole %) having a viscosity average molecular weight of 450,000 and a Mooney Viscosity (ML 1+3 min. at 260°F.) of 55. Butyl 268 rubber, 300 g., was dissolved in toluene, 2000 g. To this cement was added 16.8 ml of acetyl sulfate (theoretical level 2.0 mole %). The reaction was allowed to proceed for 30 minutes then quenched with 200 g of n-propyl alcohol. A portion of the cement (370 g - 50 g polymer) was neutralized with 3.7 g of 70% ethylamine in $H_2O$, ppt and dried. The sulfur content of the polymer as determined by Dietert sulfur analysis = 0.8 wt. % sulfur. Its Mooney Viscosity (1+8 min.) at 260°F. was 66 at 0.2 rpm.

This cement [sol vis No. 2 spindle at 12 rpm) = 4000 cps] was used to make the latex.

EXAMPLE 2

— Sulfobutyl Latex Made Using Alipal Emulsifier

| Cement Phase | Water Phase |
|---|---|
| Cement in Toluene = 370 g (from Example 1) | Deionized $H_2O$ = 300 g |
| Toluene = 27 g | n-propyl alcohol = 40 g |
| n-propyl alcohol = 30 g | Alipal (31%) = 17 g |

Procedure:

The cement phase was added to the water phase and hand stirred. It formed a homogeneous mixture. The mixture was placed in a dispersator to reduce the particle size; settings: 3 min, 40 volts open; 3 min, 110 volts open; 3 min, 110 volts closed. The particle size of the resultant raw emulsion was ca. 0.1 $\mu$ average.

The raw emulsion was stripped of excess $H_2O$ and toluene under vacuum. The finished latex 50 wt. % solid was neutralized with 3.7 g of ethylamine (70% in $H_2O$). Films were cast from the neutralized latex on glass plates. The dried film (micro samples) were tested on an Instron at 23°C. for physical properties.

Physical Properties

100% Modulus, psi = 90
300% Modulus, psi = 160
500% Modulus, psi = 270
Tensile Strength, psi = 2700
% Elongation = 980

EXAMPLE 3

— NB No. 66-2815-151 - Sulfonation and Neutralization of Butyl 268 in Toluene

Butyl 268 rubber, 200 g was dissolved in toluene, 1132 g. To this cement was added 12.6 ml of acetyl sulfate. The acetyl sulfate was prepared by reacting 18.8 ml of acetic anhydride with 5.54 ml of $H_2SO_4$ (96.5%). The sulfonation reaction was allowed to proceed for 40 minutes and quenched with 133 ml of n-propyl alcohol.

a. Neutralization with Sodium Hydroxide

A portion of the sulfonated cement 666 g was neutralized with 6.4 g of NaOH dissolved in 54 g of $H_2O$. A further portion of this neutralized cement was precipitated in acetone and dried in a vacuum oven. Dietert Sulfur Analysis = 0.7 wt. % sulfur. The major portion of the cement was used in an attempt to form a latex.

b. Neutralization with Ammonia Hydroxide

The remaining portion of the sulfonated cement 666 g was neutralized with 20 g of ammonium hydroxide (28%). This material was used in the preparation of latex.

EXAMPLE 4

— Emulsification of the Ammonium Hydroxide Neutralized Sulfobutyl

| Cement Phase | Water Phase |
|---|---|
| Cement in Toluene = 666 g | Deionized $H_2O$ = 660 g |
| N-propyl alcohol = 30 g | n-propyl alcohol = 66 g |
|  | Alipal CO433 (28%) = 39 g |

The cement phase was added to the water phase and hand-stirred. It formed a homogeneous mixture. The mixture was reduced in particle size using a dispersator as in Example 2. The particle size of the raw emulsion was ca 0.5 $\mu$ average.

The raw emulsion was stripped of excess $H_2O$ and toluene under vacuum. The finished latex 44.2 wt. % solids, pH = 6.4 had a particle size of < 1 $\mu$ average. Films were cast from the neutralized latex on glass plates. The dried film (micro samples) were tested on an Instron Tester at 24°C. to determine physical properties.

Physical Properties of Cast Film

100 Modulus psi = 85
300 Modulus psi = 140
500 Modulus psi = 220
Tensile Strength psi = 1900
% Elongation = 1050

EXAMPLE 5

— Attempted Emulsification of the Sodium Hydroxide Neutralized Sulfobutyl

All attempts including adding excess emulsifiers, > 20 wt. %, were unsuccessful in forming a raw oil in $H_2O$ emulsion with the sodium hydroxide neutralized form of sulfobutyl. In every case, a water-in-oil emulsion formed which resisted all attempts of inverting it.

What is claimed is:

1. In a process for preparing a latex of sulfonated butyl rubber sulfonated to at least 0.5 mole % $SO_3H$, the improvement which comprises:
   a. preparing a cement of butyl rubber in an aromatic hydrocarbon solvent;
   b. sulfonating the rubber;
   c. neutralizing the rubber with a weak base selected from the group consisting of ammonium hydroxide and organo amines with a $pK_b$ > 3.0; and
   d. emulsifying the cement in water with an anionic emulsifying agent; and thereafter stripping off excess water.

2. The process of claim 1 wherein the latex is treated subsequently with a stronger base.

3. The process of claim 1 wherein the weak base is ammonium hydroxide, ethylamine or triethylamine.

4. The process of claim 2 wherein the stronger base is a metal hydroxide, a metal alkoxide, metal carbonate or tetraorgano ammonium hydroxide.

5. The process of claim 4 wherein the stronger base is sodium hydroxide, sodium methoxide, barium hydroxide, sodium carbonate, barium carbonate or trimethyl benzyl ammonium hydroxide.

6. The process of claim 1 wherein the emulsifying agent is a sodium sulfate derivative of an ethoxylated nonyl phenol containing 4 moles of ethylene oxide.

7. The process of claim 1 wherein the emulsion is prepared using a coupling agent selected from the group consisting of n-propyl alcohol, butyl alcohol, cyclohexyl amine, pyridine, triethanol amine and propyl amine.

* * * * *